(12) United States Patent
Pena

(10) Patent No.: US 12,458,823 B2
(45) Date of Patent: Nov. 4, 2025

(54) STOP FIRE

(71) Applicant: Humberto Pena, Bronx, NY (US)

(72) Inventor: Humberto Pena, Bronx, NY (US)

(*) Notice: Subject to any disclaimer, the term of this patent is extended or adjusted under 35 U.S.C. 154(b) by 659 days.

(21) Appl. No.: 17/540,219

(22) Filed: Dec. 1, 2021

(65) Prior Publication Data

US 2022/0226684 A1 Jul. 21, 2022

Related U.S. Application Data

(63) Continuation-in-part of application No. 16/422,961, filed on May 25, 2019, now abandoned.

(60) Provisional application No. 62/676,286, filed on May 25, 2018.

(51) Int. Cl.
*A62C 99/00* (2010.01)
*A62C 3/00* (2006.01)

(52) U.S. Cl.
CPC ............ *A62C 99/0045* (2013.01); *A62C 3/00* (2013.01); *A62C 99/0063* (2013.01)

(58) Field of Classification Search
CPC .. A62C 3/00; A62C 3/002; A62C 3/06; A62C 99/0045; A62C 99/0063; A47J 37/0786; B65F 2001/1692; B65F 2210/181; B65F 2240/104

See application file for complete search history.

(56) References Cited

U.S. PATENT DOCUMENTS

| | | | | |
|---|---|---|---|---|
| 1,964,388 | A * | 6/1934 | Simpson | A24F 19/145 131/242.6 |
| 4,943,002 | A * | 7/1990 | Fraher | B65F 1/10 220/908 |
| 5,350,079 | A * | 9/1994 | Larson | B65F 1/163 220/264 |
| 6,170,490 | B1 * | 1/2001 | Barrow | A24F 19/0064 206/246 |
| 6,892,722 | B1 * | 5/2005 | Francies, III | A47J 37/0786 126/25 R |
| 2022/0281680 | A1 * | 9/2022 | Clute | B65F 1/10 |

FOREIGN PATENT DOCUMENTS

DE 3418829 A1 * 10/1986 ............... B65F 1/10

OTHER PUBLICATIONS

Kay Park., "Steel Coal Ash Receptacle" Archived using the Internet Way Back Machine https://archive.org/ on Jan. 21, 2021, https://kaypark.com/product/steel-coal-ash-receptacle/ (Year: 2021).*

(Continued)

*Primary Examiner* — Vivek K Shirsat
(74) *Attorney, Agent, or Firm* — Elman IP; Gerry J. Elman

(57) ABSTRACT

Apparatus and method for disposing of hot coals, e.g. charcoal briquettes after barbecuing or coals from a campfire. Sand and rain water are provided in a double-chamber device to cool it below ignition temperature. By strategically deploying the apparatus in campgrounds and forest preserves, park rangers may provide campers and hikers with a more effective tool for ensuring the fire is fully extinguished. Sand and rain water are provided in a double-chamber device to cool it below ignition temperature.

5 Claims, 4 Drawing Sheets

(56) References Cited

OTHER PUBLICATIONS

Outdoor Creations Inc., Barbecues & Fire Pits, "300CR—Hot Coal Receptacle" Archived using the Internet Way Back Machine https://archive.org/ on Oct. 17, 2021, https://outdoorcreations.com/productdetails.php?productcode=gH1DOFISXrd6RwqwxbkB (Year: 2021).*
Skully Street & Park, Hot Coal Bin, "Model: HCB120" Archived using the Internet Way Back Machine https://archive.org/ on Mar. 14, 2016, http://www.scully.net.au/hot-coal-bin/ (Year: 2016).*
Webstaurantstorem, "Wausau Tile Site Furnishing" TF1131 53 Gallon Concrete Round Hot Coal Disposal Receptacle with Grate; Spec Sheet with a date of Apr. 23, 2009 (Year: 2009).*
Pilot Rock, "Model HCB/B-1 Hot Coal Bin" Specification Sheet published Dec. 22, 2008 (Year: 2008).*
Wikihow, "How to Put Out a Campfire" Archived using the Internet Way Back Machine https://archive.org/ on Nov. 12, 2020, https://www.wikihow.com/Put-Out-a-Campfire (Year: 2020).*
Dock Box Depot, "Deluxe Triangle Dockbox" Archived using the Internet Way Back Machine https://archive.org/ on Apr. 14, 2014, http://dockboxdepot.com/triangular-dockboxes/ (Year: 2014).*
Vogel Josef E, "Ash Collecting Container," DE341889A1 (Year: 1985).*

\* cited by examiner

STOP FIRE

CROSS-REFERENCE TO RELATED APPLICATIONS

The present application is a continuation-in-part of U.S. patent application Ser. No. 16/422,961 filed May 25, 2019, which claims benefit of U.S. provisional patent application 62/676,286 filed May 25, 2018, the disclosures of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

The present invention relates generally to the field of campfire devices and more specifically relates to a device for cooling coals and briquettes below ignition temperature so that the fire has been extinguished fully.

BACKGROUND

During the last several years, the fire seasons have been particularly destructive, affecting an average of more than four million acres of land in 2013, 2014, and 2015 (or more land than the states of Connecticut and Rhode Island combined.) The fires destroyed many newer homes and communities built on the edges of forest land, and the worst may be yet to come in future years. There is growing concern in the insurance industry because of a recent trend toward increased losses from wildfires and floods. Increased exposure reflects population growth, forcing new development adjacent to wild lands and flood prone areas. These factors, coupled with changes in weather patterns and rainfall, have heightened loss potential. The insured loss from 2015's fires in California alone was 2 billion. More than seven million homes in California are in areas categorized in the three highest fire-risk levels. Insurers are also exposed to increasing flood losses for commercial and industrial properties.

Only a few years ago, several large wildfires in southern California dominated media headlines as they encroached on the suburbs surrounding both San Diego and Los Angeles. In total, about 500,000 acres of land (about the size of Rhode Island) were burned. In addition, a total of 3,581 homes, a countless number of vehicles and a number of commercial buildings were destroyed, disrupting hundreds of thousands of people's lives. Given this level of destruction, it is apparent that a real need exists for some type of device or apparatus which could be used to safeguard homes and other structures from the risks of being damaged or destroyed by rapidly spreading brush fires or forest fires.

Unfortunately, the most prevalent causes of forest fires: inattentive campers and hikers. According to the National Fire Service, over 1,000 forest fires in 2015 were caused by campers. Whether incorrectly preparing an area for a camp fire or thoughtlessly leaving burning embers behind, negligence by campers can lead to the loss of thousands of acres of land, not to mention potential property and life loss.

BRIEF SUMMARY OF THE INVENTION

The general purpose of the present invention, which will be described subsequently in greater detail, is to provide picnickers, campers and hikers with a more efficient and effective alternative for ensuring that a campfire has been extinguished fully.

The present invention is embodied in apparatus intended to be installed in picnic, camping, and hiking areas where users build fires, e.g. on the ground or in cookers. Alternative embodiments of the invention would be intended to be brought to a longer-term campground by a vehicle.

Embodiments of the invention define an inner chamber containing sand and adapted to receive rain water, within an outer chamber punctuated with multiple apertures intended to conduct cooling wind therethrough. A lid at the top is adapted to permit campers to introduce glowing coals into the inner chamber atop the wet sand, where they rest safely until extinguished. Thereafter caretakers of the apparatus may flip open the lid to remove ashes and optionally replace some or all of the sand in the inner chamber.

Embodiments of the present invention are preferably fabricated of heavy metal, with an outer casing and an inner container each in the shape of a triangular prism with its axis being vertical. Desirably the vertices of each triangular cross-section are blunted via an additional face, thereby having a cross-section that is irregularly hexagonal.

The features of the invention which are believed to be novel are particularly pointed out and distinctly claimed in the concluding portion of the specification. These and other features, aspects, and advantages of the present invention will become better understood with reference to the following drawings and detailed description.

The present invention holds significant improvements and serves as a device for safely extinguishing hot coals after use in a campfire or grill. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention.

Embodiments of the present invention will hereinafter be described in conjunction with the appended drawings, wherein like designations denote like elements.

DETAILED DESCRIPTION

Figure 1:
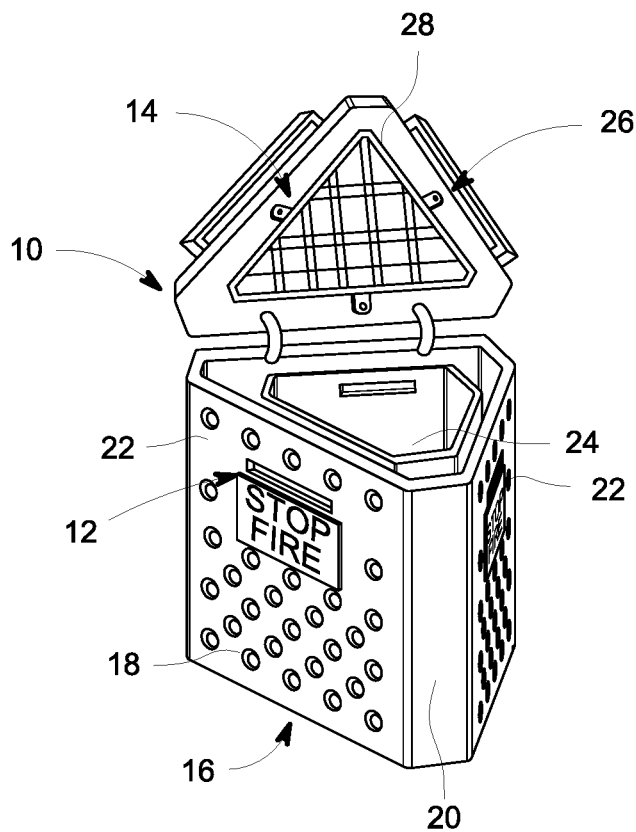
FIG. 1 is a perspective side elevation illustrating a device for extinguishing hot coals according to an embodiment of the present invention. In this view, the lid is depicted as open, revealing the top of the inner chamber. However, in use, the lid is generally closed.

As conceived, a Stop Fire product in accordance with the present invention would typically be made available in parks for consumer use. Such a device 10 comprises a body unit 12, having hinged top 14, base 16, three sides 18 that are desirably about thirty inches in width, and three sides 20 that are typically four inches in width, wherein body unit 12 has the shape of a triangular prism with its axis vertical, and with vertices blunted by the three sides 20. A multiplicity of openings 22 are provided in each side 18 of body unit 12 for cooling air flow. In this embodiment, body unit 12 is twenty-five inches in height, and wherein the three four-inch sides 20 and the three thirty-inch sides 12 alternate to form a triangular shape with flat corners, i.e. an irregular hexagon.

An inner chamber 24 (see also FIG. 7) is provided within the body unit 12. Inner chamber 24 contains sand and water as a quenching agent. The water may be provided periodically by caretakers or by exposing the device to rain in the environment.

The body unit 12 is made of sturdy metal. The inner chamber 24 body is desirably of aluminum, with some parts being of polymeric substance, to minimize weight of the inner chamber 24.

The hinged top 14 desirably has a magnet 26 on each of its sides to ensure its use in adding hot coals into the inner chamber 24. It is configured to be openable only by authorized personnel to allow for removal of the inner chamber 24 and emptying it when full.

Figure 3:
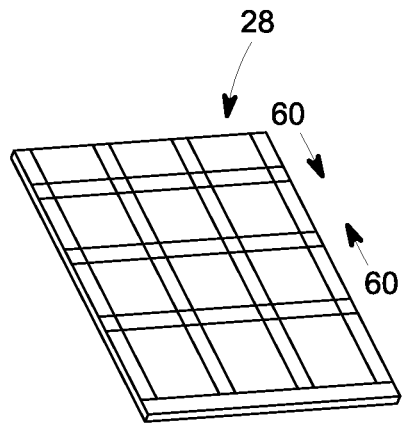
FIG. 3 is a partial perspective view illustrating a mesh on the under side of the lid of FIGS. 1 and 2.
Figure 4:
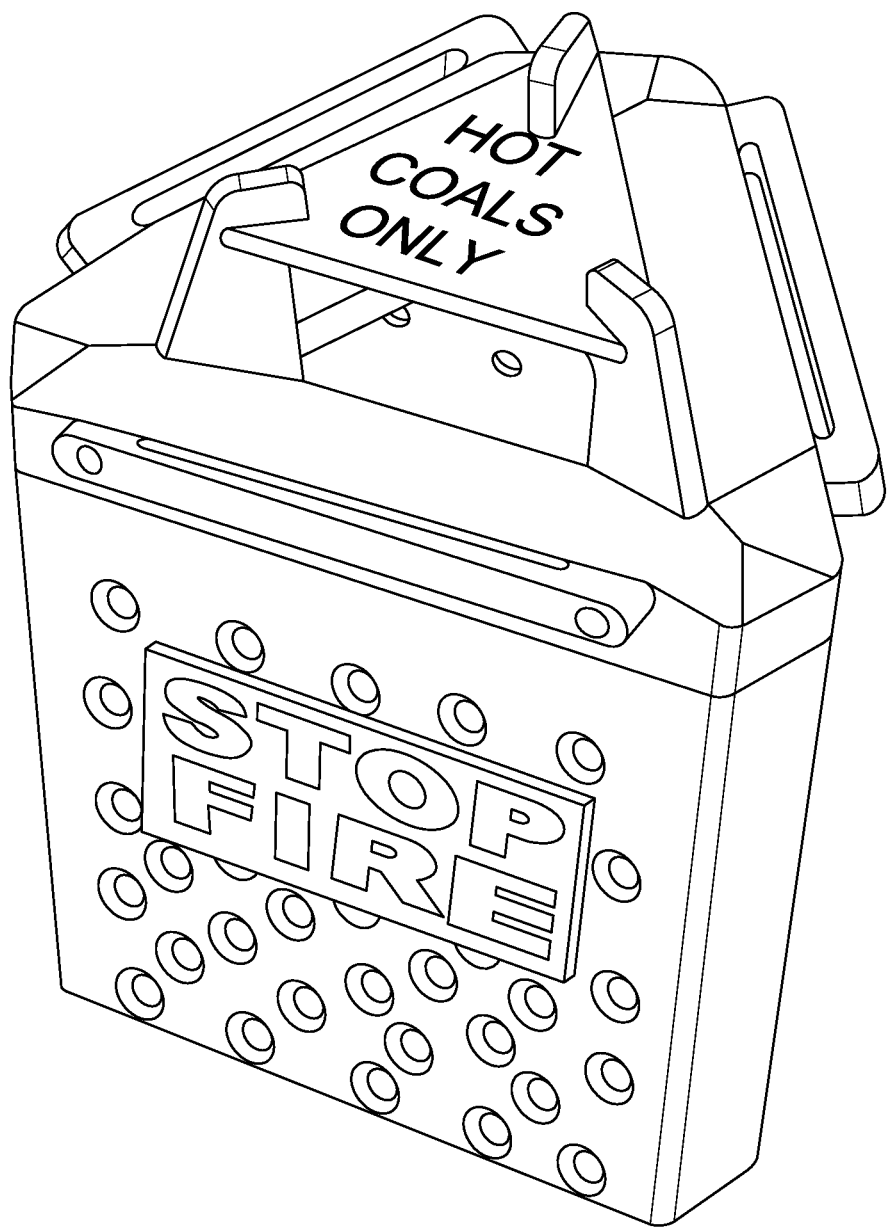
FIG. 4 is a perspective view illustrating a device similar to that shown in FIG. 1, with the lid closed. Arrows point to openings in the lid through which hot coals are introduced into the device.
Figure 5:
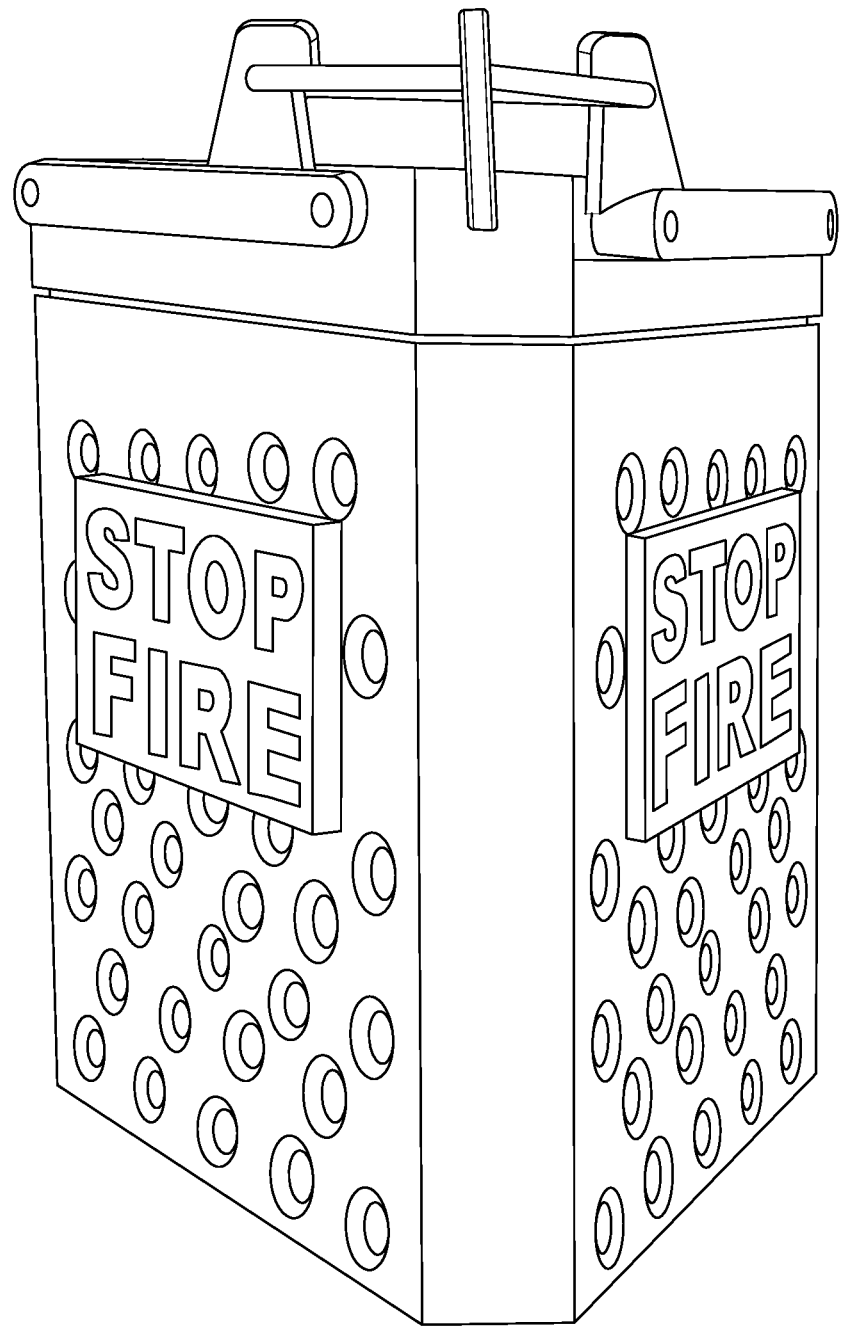
FIG. 5 is an elevation view of the device of FIG. 4.

The top 14 has a mesh 28 (see also FIG. 3) with openings of width 60, for example 3.5 inches, to allow for hot coals to be introduced through the top 14 into the inner chamber 24.

The inner chamber is provided with a part that allows water to flow into its sides and keep the sand therein in a moist state.

Figure 2:
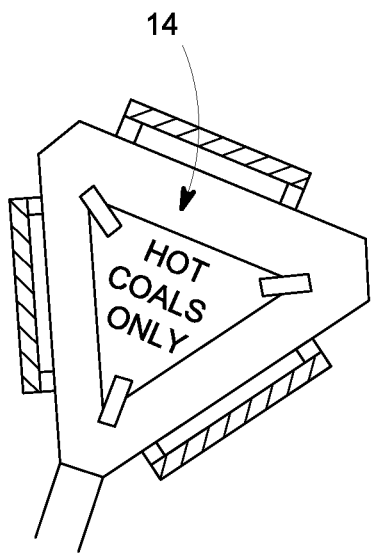
FIG. 2 is a plan view showing the top of a lid of FIG. 1.

As shown in FIG. 2, the top 14 is prominently labeled "HOT COALS ONLY" where it is visible to users. Being at a height of approximately twenty-five inches, it is a visible warning of the hot contents going into the device.

Figure 6:
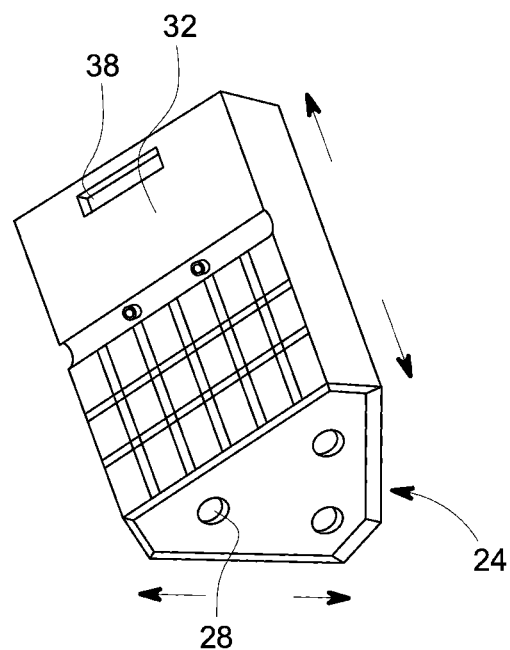
FIG. 6 is a perspective view from below, showing the inner chamber removed from the device of FIG. 1.
Figure 7:
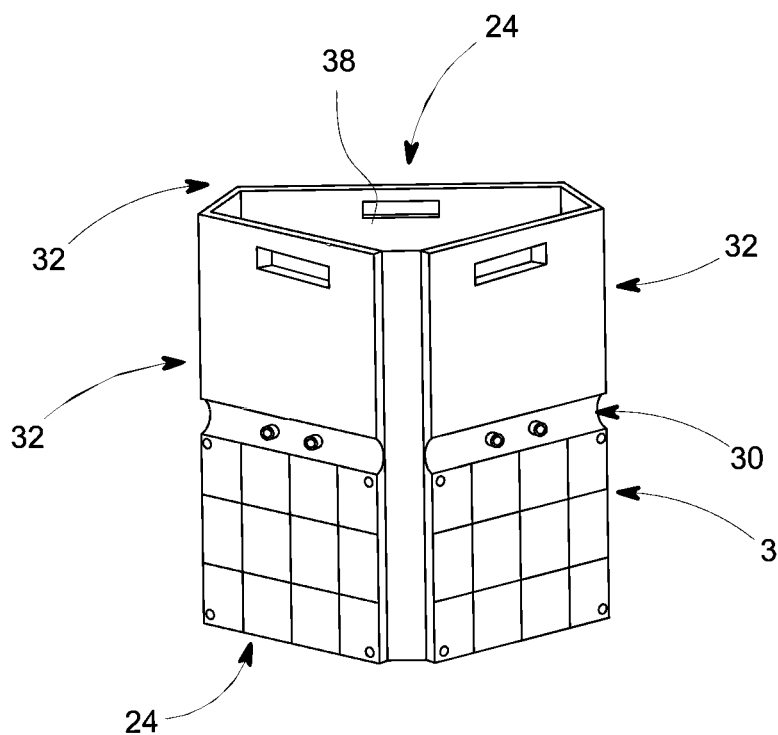
FIG. 7 is a perspective elevation view of the inner chamber of FIG. 6.

As shown in FIGS. 6 and 7, the inner chamber 24 of aluminum has a shape that fits loosely within the body unit 12. It is desirably twenty-two inches in height and twenty-six inches wide. On each side of the inner chamber 24 are a pair of holes 30 for the entry of rain water. A cool area will be maintained where the temperature of the coal is lowered. The rain water enters the side of the inner chamber 24 that contains sand. As shown in FIG. 6, drainage holes 28 are provided in the bottom of the inner chamber 24.

Slots 38 are provided in the inner chamber 24 to facilitate removal from the device for emptying and replacement.

The upper section 32 of the inner chamber 24 may be of plastic material that is resistant to heat and yet light weight.

The embodiments of the invention described herein are exemplary and numerous modifications, variations and rearrangements can be readily envisioned to achieve substantially equivalent results, all of which are intended to be embraced within the spirit and scope of the invention. Further, the purpose of the Abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed as new and desired to be protected by Letters Patent is set forth in the following claims:

1. A device for quenching hot coals, the device comprising:
   (1) a body unit having (a) an openable top, (b) a base, and (c) at least three sides;
   (2) an inner chamber containing
   (3) a quenching agent comprising a mixture of sand and water, wherein the inner chamber is containable inside the body unit and comprises a bottom having drainage holes;
   the top having openings sized to allow introduction of hot coals into the inner chamber to quench them, and
   wherein the body unit has six sides.

2. The device for quenching hot coals according to claim 1, wherein the body unit is twenty-five inches in height, wherein three of the six sides are four inches wide, and three of the six sides are thirty inches wide, and wherein the three four-inches sides and the three thirty-inches sides alternate to form a triangular shape with flat corners.

3. The device for quenching hot coals according to claim 1, wherein the body unit is twenty-five inches in height and thirty inches in width.

4. The device for quenching hot coals according to claim 1, wherein the top of the body unit has an egress point integrated therein.

5. A device for quenching hot coals, the device comprising:
   (1) a body unit having (a) an openable top, (b) a base, and (c) at least three sides;
   (2) an inner chamber containing
   (3) a quenching agent comprising a mixture of sand and water, wherein the inner chamber is containable inside the body unit;
   the top having openings sized to allow introduction of hot coals into the inner chamber to quench them,
   the body unit and the inner chamber having a multiplicity of openings for cooling air flow;
   and the inner chamber being configured to allow water to flow into its sides and keep the quenching agent therein in a moist state.

* * * * *